United States Patent
Scot et al.

(10) Patent No.: US 12,231,408 B2
(45) Date of Patent: Feb. 18, 2025

(54) SECURE DATA TRANSFER REQUEST ROUTING FOR PEER-TO-PEER SERVICES

(71) Applicant: Bank of America Corporation, Charlotte, NC (US)

(72) Inventors: Richard S. Scot, Huntersville, NC (US); James J. Siekman, Charlotte, NC (US); Neal Aaron Slensker, Fort Mill, SC (US); Basil C. Doyle, Chicago, IL (US)

(73) Assignee: Bank of America Corporation, Charlotte, NC (US)

( * ) Notice: Subject to any disclaimer, the term of this patent is extended or adjusted under 35 U.S.C. 154(b) by 443 days.

(21) Appl. No.: 17/576,412

(22) Filed: Jan. 14, 2022

(65) Prior Publication Data
US 2023/0231832 A1 Jul. 20, 2023

(51) Int. Cl.
*H04L 9/40* (2022.01)
*H04L 45/302* (2022.01)
*H04L 67/306* (2022.01)
*H04L 67/63* (2022.01)

(52) U.S. Cl.
CPC ............ *H04L 63/04* (2013.01); *H04L 45/308* (2013.01); *H04L 67/306* (2013.01); *H04L 67/63* (2022.05)

(58) Field of Classification Search
CPC ..... H04L 67/63; H04L 67/306; H04L 45/308; H04L 63/04
USPC ......................................................... 726/26
See application file for complete search history.

(56) References Cited

U.S. PATENT DOCUMENTS

| | | | |
|---|---|---|---|
| 5,243,592 A | 9/1993 | Perlman et al. | |
| 5,367,698 A | 11/1994 | Webber et al. | |
| 5,550,976 A | 8/1996 | Henderson et al. | |
| 5,586,260 A | 12/1996 | Hu | |
| 6,065,062 A | 5/2000 | Periasamy et al. | |
| 6,260,072 B1 | 7/2001 | Rodriguez-Moral | |
| 6,742,028 B1 | 5/2004 | Wang et al. | |
| 6,928,476 B2 | 8/2005 | Bucher | |
| 6,978,294 B1 | 12/2005 | Adams et al. | |
| 7,127,613 B2 | 10/2006 | Pabla et al. | |
| 7,275,102 B2 | 9/2007 | Yeager et al. | |
| 7,363,343 B2 | 4/2008 | Bucher | |
| 7,529,785 B1 | 5/2009 | Spertus et al. | |
| 7,664,861 B2 | 2/2010 | Guntupalli et al. | |
| 7,782,866 B1 | 8/2010 | Walsh et al. | |
| 11,599,885 B1 * | 3/2023 | Allen | G06Q 20/4018 |
| 11,924,159 B2 * | 3/2024 | Nair | G06Q 20/00 |
| 11,961,055 B1 * | 4/2024 | Bhatt | G06Q 20/102 |

(Continued)

*Primary Examiner* — Lan Dai T Truong (57) ABSTRACT

A device configured to receive a data transfer initiation request from a first user and to identify a user profile that is associated with a first user identifier for the first user. The device is further configured to obtain an account number and a routing number for the first user from the user profile. The device is further configured to obtain routing instructions for a service provider based on a service provider identifier. The device is further configured to generate a data transfer request that includes the account number for the first user, the routing number for the first user, a second user identifier for a second user, a data type identifier, and a data transfer type identifier. The device is further configured to send the data transfer request to the service provider in accordance with the routing instructions for the service provider.

20 Claims, 3 Drawing Sheets

(56) References Cited

U.S. PATENT DOCUMENTS

| | | |
|---|---|---|
| 2002/0007350 A1 | 1/2002 | Yen |
| 2002/0049760 A1 | 4/2002 | Scott et al. |
| 2002/0073204 A1 | 6/2002 | Dutta et al. |
| 2002/0098849 A1 | 7/2002 | Bloebaum et al. |
| 2002/0103998 A1 | 8/2002 | Debruine |
| 2002/0138552 A1 | 9/2002 | Debruine et al. |
| 2002/0138744 A1 | 9/2002 | Schleicher et al. |
| 2002/0178261 A1 | 11/2002 | Chang et al. |
| 2002/0188735 A1 | 12/2002 | Needham et al. |
| 2002/0198930 A1 | 12/2002 | Jones et al. |
| 2003/0009518 A1 | 1/2003 | Harrow et al. |
| 2003/0009586 A1 | 1/2003 | Harrow et al. |
| 2003/0009587 A1 | 1/2003 | Harrow et al. |
| 2003/0018712 A1 | 1/2003 | Harrow et al. |
| 2003/0115251 A1 | 6/2003 | Fredrickson et al. |
| 2003/0120699 A1 | 6/2003 | Hostetter et al. |
| 2003/0163702 A1 | 8/2003 | Vigue et al. |
| 2004/0019640 A1 | 1/2004 | Bartram et al. |
| 2004/0042403 A1 | 3/2004 | Xu et al. |
| 2004/0098502 A1 | 5/2004 | Xu et al. |
| 2005/0185636 A1 | 8/2005 | Bucher |
| 2006/0015562 A1 | 1/2006 | Kilian-Kehr et al. |
| 2007/0106805 A1 | 5/2007 | Marples et al. |
| 2019/0019174 A1* | 1/2019 | Mohsenzadeh ........ G06Q 20/34 |
| 2023/0134689 A1* | 5/2023 | Le ........................ G06Q 20/24 705/44 |

* cited by examiner

SECURE DATA TRANSFER REQUEST ROUTING FOR PEER-TO-PEER SERVICES

TECHNICAL FIELD

The present disclosure relates generally to information security, and more specifically to data transfer request routing for peer-to-peer services.

BACKGROUND

Securely transferring data and information across a network poses several technical challenges. Networks are susceptible to attacks by unauthorized users trying to gain access to sensitive information being communicated across the network. Unauthorized access to a network may compromise the security of the data and information being communicated across the network. Using existing computer systems, when a user wants to perform a peer-to-peer data transfer with another user, the user typically has to provide their account information and account information for the other party to the network device that will facilitate the data transfer. This means that the user has to transit sensitive account information both for themselves and another user over the network to request the data transfer. Transmitting such sensitive information over the network is poses an information security threat since a bad actor can intercept the information and gain unauthorized access to the transmitted account information.

SUMMARY

The disclosed system provides several practical applications and technical advantages that overcome the previously discussed technical problems. The following disclosure provides a practical application of a data routing device for a computer system. The disclosed data routing device provides practical applications that improve the information security of the computer network by reducing the amount of sensitive information that is transmitted over the network. For example, the disclosed computer system allows a user to request a data transfer with another user without providing account information for themselves or the other party. This means that their sensitive account information will not be transmitted over the network. This process provides a technical advantage because a bad actor cannot gain access to any account information in the event that their communications are intercepted or otherwise compromised. By reducing the amount of sensitive information that is transmitted over the network, the computer system can avoid unauthorized access to account information and any other sensitive information. Thus, the disclosed process improves the information security and overall operation of the computer system.

In one embodiment, the computer system comprises a data routing device that is configured to receive a data transfer initiation request from a first user and to identify a user profile that is associated with a first user identifier for the first user. The data routing device is further configured to obtain an account number and a routing number for the first user from the user profile. The data routing device is further configured to obtain routing instructions for a service provider based on a service provider identifier that is provided in the data transfer initiation request. The data routing device is further configured to generate a data transfer request based on the identified information and to send the data transfer request to the service provider in accordance with the routing instructions for the service provider.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Computer System Overview

Figure 1:
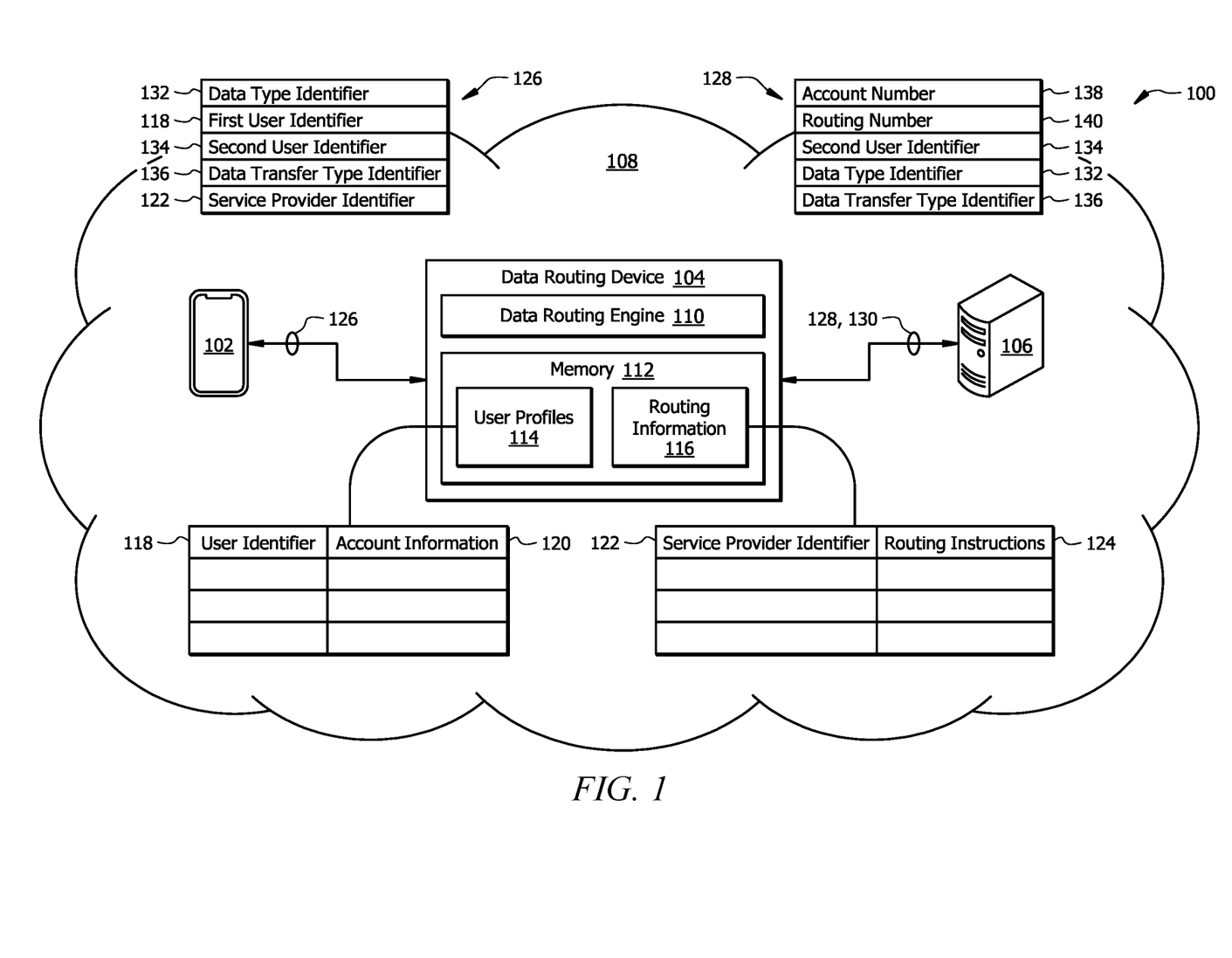
FIG. 1 is a schematic diagram for a computer system configured with a data routing device for data transfer requests.

FIG. 1 is a schematic diagram of an embodiment of a computer system 100 that is generally configured to generate a data transfer request 128 that can be routed to a service provider to facilitate a peer-to-peer transfer between a pair of users. After generating the data transfer request 128, the computer system 100 is further configured to identify a network device 106 that is associated with the service provider and to identify routing instructions 124 for how to communicate with the identified network device 106. This process allows the first user to request a data transfer without requiring a user to provide any account information (e.g. an account number or routing number) for another user. In addition, the process also allows the user to request a data transfer without having to identify a network device 106 that is associated with the service provider and without having to provide any routing instructions 124 for communicating with the service provider. This process provides improved information security by reducing the amount of sensitive information that is transmitted over the network 108.

In one embodiment, the computer system 100 comprises one or more user devices 102, a data routing device 104, and one or more network devices 106 that are each associated with a service provider. The user devices 102, the data routing device 104, and the network devices 106 are in signal communication with each other within a network 108. The network 108 allows communication between and amongst the various components of the computer system 100. This disclosure contemplates the network 108 being any suitable network operable to facilitate communication between the components of the computer system 100. The network 108 may include any interconnecting system capable of transmitting audio, video, signals, data, messages, or any combination of the preceding. The network 108 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

User Devices

A user device 102 is a hardware device that is generally configured to provide hardware and software resources to a user. Examples of the user device 102 include, but are not limited to, a smartphone, a tablet, a laptop, a computer, a smart device, or any other suitable type of device. The user device 102 is configured to allow the user to send messages (e.g. data transfer initiation requests 126) to the data routing device 104 to request a peer-to-peer data transfer between the user and another user. For example, the user may generate a data transfer initiation request 126 by using a user interface on the user device 102 to interact with an application on their user device 102. In this example, the user device 102 provides user inputs into the application that are used to generate a data transfer initiation request 126. A data transfer initiation request 126 is a request for a peer-to-peer data transfer from one user to another user using a specified service provider. Examples of data that can be transferred include, but are not limited to, documents, text files, audio files, video files, currency, or any other suitable type of data. The user device 102 is configured to use the information provided by the user to generate and send a data transfer initiation request 126 to the data routing device 104. The user device 102 may send the data transfer initiation request 126 using an Application Programming Interface (API) or any other suitable type of messaging service.

Network Devices

Network devices 106 are hardware devices that are generally configured to provide hardware and software resources to a service provider. Examples of network devices 106 include, but are not limited to, a computer, a server, a database, or any other suitable type of device. A service provider is an entity that provides peer-to-peer data transfer services between users. As an example, a service provider may be an entity that provides file transfer services between users. As another example, a service provider may be an entity that provides currency transfer services between users. In other examples, a service provider may be an entity that provides any other suitable type of data transfer between users.

Data Routing Device

Examples of the data routing device 104 include, but are not limited to, an access point, a server, a computer, or any other suitable type of network device. The data routing device 104 is a hardware device that is associated with an entity that provides access to data resources and/or stores data resources for its members. In one embodiment, a data routing device 104 comprises a data routing engine 110 and a memory 112. Additional details about the hardware configuration of the data routing device 104 are described in FIG. 3. The memory 112 is configured to store user profiles 114, routing information 116, and/or any other suitable type of data.

In one embodiment, the data routing engine 110 is generally configured to receive a data transfer initiation request 126 from a first user and to generate a data transfer request 128 for a data transfer between the first user and a second user based on the information provided in the data transfer initiation request 126. The data routing device 104 is further configured to identify a network device 106 that is associated with a service provider that can facilitate a peer-to-peer transfer between an account of the first user and an account of the second user and to send the data transfer request 128 to the identified network device 106. This process allows the first user to request a data transfer without requiring the first user to provide any account information (e.g. an account number or routing number) for the second user. Instead, the first user can request a data transfer by providing a user identifier (e.g. a name, phone number, or email address) for the second user and a service provider identifier 122 that identifies the service provider that will be used for the data transfer. An example of the data routing device 104 performing these operations is described in FIG. 2.

The user profiles 114 generally comprises account information 120 for a plurality of users. Each user is associated with a user identifier 118 that is linked with their account information 120. Examples of user identifiers 118 include, but are not limited to, names, account numbers, alphanumeric codes, phone numbers, email addresses, or any other suitable type of identifier. As an example, each user may be assigned and linked with an account number 138 and routing number 140 from an entity that is associated with the data routing device 104. This assignment allows each user to be uniquely identified and linked with their account information 120. The account information 120 may comprise an account number 138, a routing number 140, an account balance, data files, a user profile, contact information, user history, or any other suitable type of information that is associated with the user.

The routing information 116 generally comprises routing instructions 124 for communicating with network devices 106 for different service providers. Each service provider is associated with a service provider identifier 122 that is linked with their corresponding routing instructions 124. Examples of service provider identifiers 122 include, but are not limited to, an entity name, alphanumeric codes, or any other suitable type of identifier. The routing instructions 124 may comprise a Media Access Control (MAC) address, an Internet Protocol (IP) address, a routing number, or any other suitable type of routing information for communicating with a network device 106 that is associated with a service provider.

Data Routing Process

Figure 2:
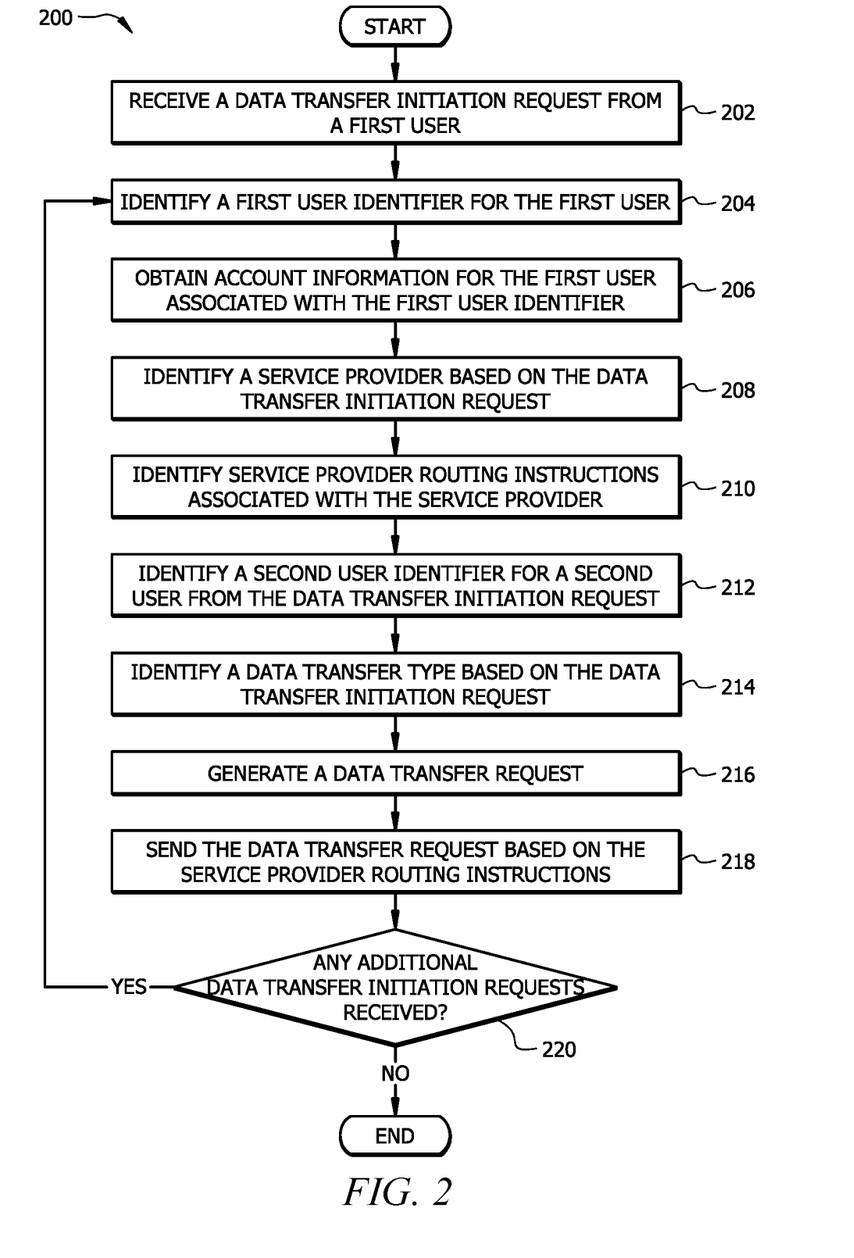
FIG. 2 is a flowchart of an embodiment of a data routing process for the computer system.

FIG. 2 is a flowchart of an embodiment of a data routing process 200 for the computer system 100. The computer system 100 may employ process 200 to generate a data transfer request 128 that can be routed to a service provider to facilitate a peer-to-peer transfer between a pair of users. After generating the data transfer request 128, the computer system 100 may also employ process 200 to identify a network device 106 that is associated with the service provider and routing instructions 124 for how to communicate with the identified network device 106. This process allows the first user to request a data transfer without requiring the first user to provide any account information (e.g. an account number or routing number) for the second user and without providing any routing instructions 124 for communicating with the service provider.

At operation 202, the data routing device 104 receives a data transfer initiation request 126 from a first user. The first user generates and sends the data transfer initiation request 126 using their user device 102. For example, the first user may access an application on their user device 102 to provide user inputs for generating a data transfer initiation request 126. In one embodiment, the data transfer initiation request 126 comprises a data type identifier 132 that identifies the data element or type of data to be transferred between users. The data type identifier 132 may identify a data element to transfer, data type (e.g. a file, a document, a currency, etc.) to transfer, and/or an amount of data to transfer. The data transfer initiation request 126 further comprises a first user identifier 118 that identifies the first user that is requesting the data transfer and a second user identifier 134 for a second user that will be involved in the data transfer. The data transfer initiation request 126 further comprises a service provider identifier 122 that identifies a service provider that will be used to facilitate the data transfer between the first user and the second user. The data transfer initiation request 126 further comprises a data transfer type identifier 136 that indicates whether the requested data transfer is a data transfer from the first user to the second user or a data transfer from the second user to the first user. In other embodiments, the data transfer initiation request 126 may further comprise any other suitable type of information that is associated with the data transfer. After generating the data transfer initiation request 126, the first user may use their user device 102 to send the data transfer initiation request 126 to the data routing device 104 via an API call from the application on their user device 102. The data routing device 104 then receives the data transfer initiation request 126 from the user device 102 and begins extracting information from the data transfer initiation request 126 for processing.

At operation 204, the data routing device 104 identifies a first user identifier 118 for the first user from the data transfer initiation request 126. After receiving the data transfer initiation request 126, the data routing device 104 begins parsing the information in the data transfer initiation request 126 to identify the first user that is requesting a data transfer. For example, the data routing device 104 may identify a first user identifier 118 that corresponds with the first user who sent the data transfer initiation request 126. The first user identifier 118 may be a name, a phone number, an account number, an email address, an alphanumeric code, or any other suitable type of identifier for the first user.

At operation 206, the data routing device 104 obtains account information 120 for the first user that is associated with the first user identifier 118. Here, the data routing device 104 uses the first user identifier 118 that was identified in operation 208 to identify a user profile 114 and account information 120 that is linked with the first user. For example, the data routing device 104 may use the first user identifier 118 as a search token to look up account information 120 for the first user within the user profiles 114. In one embodiment, the data routing device 104 uses to first user identifier 118 to obtain a routing number 140 and an account number 138 that is associated with the first user. In other embodiments, the data routing device 104 may obtain a MAC address, an IP address, or any other suitable type of information that is associated with routing data to a device or an account that is associated with the first user.

At operation 208, the data routing device 104 identifies a service provider based on the data transfer initiation request 126. After identifying the account information 120 for the first user, the data routing device 104 then parses the information in the data transfer initiation request 126 to identify the requested service provider for facilitating the data transfer. For example, the data routing device 104 may identify a service provider identifier 122 that is associated with a service provider that is specified in the data transfer initiation request 126. The service provider identifier 122 may be an entity name, an account number, an email address, an alphanumeric code, or any other suitable type of identifier for the service provider.

At operation 210, the data routing device 104 identifies service provider routing instructions 124 that are associated with the identified service provider. Here, the data routing device 104 uses the service provider identifier 122 that was identified in operation 208 to identify routing instructions 124 for a network device 106 that is associated with the service provider. For example, the data routing device 104 may use the service provider identifier 122 as a search token to look up routing instructions 124 for the service provider in the routing information 116. The routing instructions 124 may identify a MAC address, an IP address, a routing number, a communication protocol, an encryption protocol, or any other suitable type of information for communicating with the identified network device 106.

At operation 212, the data routing device 104 identifies a second user identifier 134 for a second user from the data transfer initiation request 126. To identify the second user, the data routing device 104 parses the data transfer initiation request 126 to identify a second user identifier 134 from the data transfer initiation request 126 that is associated with another user that the first user would like to make a data transfer with. The second user identifier 134 may be a phone number, an email address, an alphanumeric code, or any other suitable type of identifier for the second user.

At operation 214, the data routing device 104 identifies a data transfer type based on the information in the data transfer initiation request 126. The data transfer type indicates which user will be sending the data and which user will be receiving the data. In other words, the data transfer type identifier 136 indicates either a data transfer from the first user to the second user or a data transfer from the second user to the first user. In one embodiment, the data transfer initiation request 126 may comprise a flag bit or an alphanumeric value that indicates whether the data transfer type corresponds with a data transfer from the first user to the second user or a data transfer from the second user to the first user. For example, the data transfer initiation request 126 may comprise a first alphanumeric value that indicates the data transfer type corresponds with a data transfer from the first user to the second user and a second alphanumeric value that indicates the data transfer type corresponds with a data transfer from the second user to the first user. In other embodiments, the data transfer initiation request 126 may use any other suitable type of value or representation to indicate the data transfer type.

At operation 216, the data routing device 104 generates a data transfer request 128 using a combination of information from the data transfer initiation request 126 and the previously identified information. In one embodiment, the data transfer request 128 comprises the account number 138 for the first user, the routing number 140 for the first user, the second user identifier 134 for the second user, the data type identifier 132, and the data transfer type identifier 136. In other embodiments, the data transfer request 128 may further comprise any other suitable type of information associated with the first user, the second user, or the requested data transfer. As an example, the data routing device 104 may generate a data transfer request 128 for a file transfer between the first user and the second user. In this example, the data transfer request 128 comprises a data type identifier 132 that identifies one or more data files to transfer between an account associated with the first user and an account associated with the second user. As another example, the data routing device 104 may generate a data transfer request 128 for a currency transfer between the first user and the second user. In this example, the data transfer request 128 comprises a data type identifier 132 that identifies an amount of currency to transfer between an account associated with the first user and an account associated with the second user. In other examples, the data transfer request 128 may comprise a data type identifier 132 that identifies any other suitable type of data transfer between the first user and the second user. The data routing device 104 may format the data transfer request 128 using any suitable type of messaging format.

At operation 218, the data routing device 104 sends the data transfer request 128 to the service provider in accordance with the routing instructions 124 that were identified in operation 210. For example, the data routing device 104 may send the data transfer request 128 to a MAC address or an IP address for the network device 106 that is associated with the identified service provider. The data routing device 104 may send the data transfer request 128 to the network device 106 using any suitable messaging protocol. By sending the data transfer request 128 to the network device 106, the data routing device 104 initiates the data transfer 130 by the service provider between the first user and the second user. For example, the network device 106 may use the second user identifier 134 to identify account information and routing information for an account that is associated with the second user. The network device 106 uses the account number 138 and the routing number 140 for the first user to identify an account that is associated with the first user. The network device 106 uses the data type identifier 132 to identify a type and/or an amount of data to transfer between the first user and the second user. The network device 106 uses the data transfer type to determine whether data is being transferred from the first user to the second user or from the second user to the first user. After determining the details for the data transfer 130, the network device 106 may then facilitate a peer-to-peer data transfer 130 between the account associated with the first user and the account associated with the second user. At operation 220, the data routing device 104 determines whether any additional data transfer initiation requests 126 have been received. Here, the data routing device 104 checks whether any additional data transfer initiation requests 126 have been received for a user. The data routing device 104 returns to operation 204 in response to determining that another data transfer initiation request 126 has been received. In this case, the data routing device 104 returns to operation 204 to extract information from another data transfer initiation request 126 for processing. For example, the data routing device 104 may receive another data transfer initiation request 126 for another data transfer between a pair of users. Otherwise, the data routing device 104 terminates process 200 in response to determining that another data transfer initiation request 126 has not been received. In some embodiments, the data routing device 104 may alternatively return to operation 202 to wait for additional data transfer initiation requests 126.

Hardware Configuration for the Data Routing Device

Figure 3:
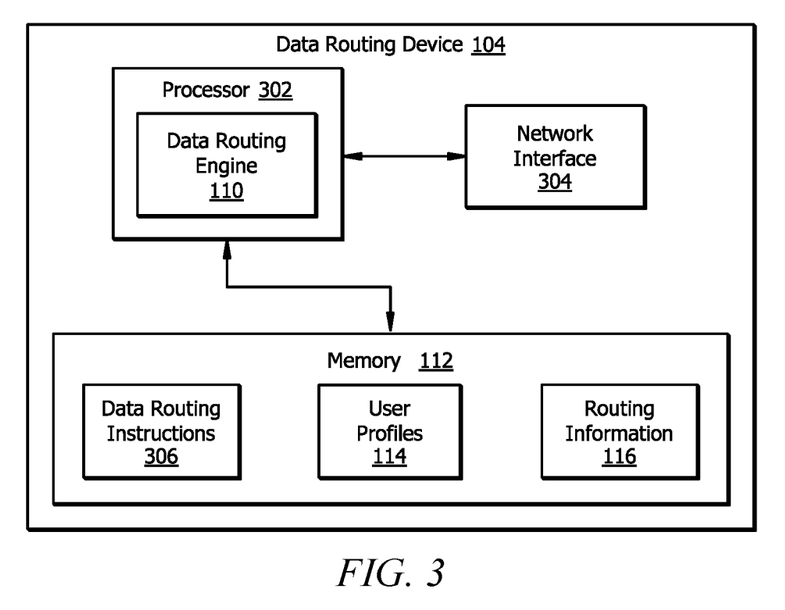
FIG. 3 is an embodiment of a data routing device for the computer system.

FIG. 3 is an embodiment of a data routing device 104 for the computer system 100. As an example, the data routing device 104 may be a server, an access point, or a computer. The data routing device 104 comprises a processor 302, a memory 112, and a network interface 304. The data routing device 104 may be configured as shown or in any other suitable configuration.

Processor

The processor 302 is a hardware device that comprises one or more processors operably coupled to the memory 112. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 112 and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute data routing instructions 306 to implement the data routing engine 110. In this way, processor 302 may be a special-purpose computer designed to implement the functions disclosed herein. In an embodiment, the data routing engine 110 is implemented using logic units, FPGAs, ASICs, DSPs, or any other suitable hardware. The data routing engine 110 is configured to operate as described in FIGS. 1 and 2. For example, the data routing engine 110 may be configured to perform the operations of process 200 as described in FIG. 2.

Memory

The memory 112 is a hardware device that is operable to store any of the information described above with respect to FIGS. 1 and 2 along with any other data, instructions, logic, rules, or code operable to implement the function(s) described herein when executed by the processor 302. The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store data routing instructions 306, user profiles 114, routing information 116, and/or any other data or instructions. The data routing instructions 306 may comprise any suitable set of instructions, logic, rules, or code operable to execute the data routing engine 110. The user profiles 114 and the routing information 116 are configured similar to the user profiles 114 and the routing information 116 described in FIGS. 1 and 2, respectively.

Network Interface

The network interface 304 is a hardware device that is configured to enable wired and/or wireless communications. The network interface 304 is configured to communicate data between user devices 102, network devices 106, and other devices, systems, or domains. For example, the network interface 304 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A data routing device, comprising:
   a memory operable to store:
      user profiles, wherein:
         each user profile is associated with a user identifier for a user; and
         each user profile is associated with an account number and a routing number; and
      routing information for a plurality of service providers, wherein:
         each service provider is configured to provide a peer-to-peer data transfer service:
         each service provider is associated with a service provider identifier; and
         each service provider identifier is linked with routing instructions for sending messages to a network device associated with a service provider; and
   a processor operably coupled to the memory, configured to:
      receive a data transfer initiation request from a first user, wherein the data transfer initiation request comprises:
         a data type identifier, wherein the data type identifier identifies a type of data to be transferred;
         a first user identifier for the first user;
         a second user identifier for a second user;
         a service provider identifier for a service provider; and
         a data transfer type identifier, wherein the data transfer type identifier indicates one of a data transfer from the first user to the second user or a data transfer from the second user to the first user;
      identify a user profile that is associated with the first user identifier;
      obtain a first account number for the first user that is associated with the user profile;
      obtain a first routing number for the first user that is associated with the user profile;
      utilize the service provider identifier as a search token to identify the service provider within the routing information for the plurality of service providers in the memory;
      utilize the service provider identifier as the search token to obtain routing instructions for a first network device that is associated with the service provider from the routing information for the plurality of service providers in the memory;
      generate a data transfer request that comprises:
         the first account number for the first user;
         the first routing number for the first user;
         the second user identifier for the second user;
         the data type identifier; and
         the data transfer type identifier;
      send the data transfer request to the first network device that is associated with the service provider in accordance with the routing instructions for the service provider, wherein sending the data transfer request initiates a data transfer between the first user and the second user.

2. The device of claim 1, wherein the second user identifier comprises a phone number for the second user.

3. The device of claim 1, wherein the second user identifier comprises an email address for the second user.

4. The device of claim 1, wherein the second user identifier comprises an alphanumeric code for the second user.

5. The device of claim 1, wherein the data type identifier further identifies an amount of data to be transferred.

6. The device of claim 1, wherein the data transfer type identifier indicates a data transfer from the second user to the first user.

7. The device of claim 1, wherein the data transfer type identifier indicates a data transfer from the first user to the second user.

8. A data routing method, comprising:
   receiving a data transfer initiation request from a first user, wherein the data transfer initiation request comprises:
      a data type identifier, wherein the data type identifier identifies a type of data to be transferred;
      a first user identifier for the first user;
      a second user identifier for a second user;
      a service provider identifier for a service provider, wherein the service provider is configured to provide a peer-to-peer data transfer service; and
      a data transfer type identifier, wherein the data transfer type identifier indicates one of a data transfer from the first user to the second user or a data transfer from the second user to the first user;
   identifying a user profile from among a plurality of user profiles that is associated with the first user identifier, wherein each user profile is associated with an account number and a routing number;
   obtaining a first account number for the first user that is associated with the user profile;
   obtaining a first routing number for the first user that is associated with the user profile;
   utilizing the service provider identifier as a search token to identify the service provider within routing information for a plurality of service providers;
   utilizing the service provider identifier as the search token to obtain routing instructions for a first network device that is associated with the service provider from the routing information for the plurality of service providers, wherein the routing information comprises routing instructions for sending messages to the first network device that is associated with the service provider;

generating a data transfer request that comprises;
  the first account number for the first user;
  the first routing number for the first user;
  the second user identifier for the second user;
  the data type identifier; and
  the data transfer type identifier;
sending the data transfer request to the first network device that is associated with the service provider in accordance with the routing instructions for the service provider, wherein sending the data transfer request initiates a data transfer between the first user and the second user.

9. The method of claim 8, wherein the second user identifier comprises a phone number for the second user.

10. The method of claim 8, wherein the second user identifier comprises an email address for the second user.

11. The method of claim 8, wherein the second user identifier comprises an alphanumeric code for the second user.

12. The method of claim 8, wherein the data type identifier further identifies an amount of data to be transferred.

13. The method of claim 8, wherein the data transfer type identifier indicates a data transfer from the second user to the first user.

14. The method of claim 8, wherein the data transfer type identifier indicates a data transfer from the first user to the second user.

15. A non-transitory computer-readable medium storing instructions that when executed by a processor cause the processor to:
  receive a data transfer initiation request from a first user, wherein the data transfer comprises:
    a data type identifier, wherein the data type identifier identifies a type of data to be transferred;
    a first user identifier for the first user;
    a second user identifier for a second user;
    a service provider identifier for a service provider, wherein the service provider is configured to provide a peer-to-peer data transfer service; and
    a data transfer type identifier, wherein the data transfer type identifier indicates one of a data transfer from the first user to the second user or a data transfer from the second user to the first user;
  identify a user profile from among a plurality of user profiles that is associated with the first user identifier, wherein each user profile is associated with an account number and a routing number;
  obtain a first account number for the first user that is associated with the user profile;
  obtain a first routing number for the first user that is associated with the user profile;
  utilize the service provider identifier as a search token to identify the service provider within routing information for a plurality of service providers;
  utilize the service provider identifier as the search token to obtain routing instructions for a first network device that is associated with the service provider from the routing information for the plurality of service providers, wherein the routing information comprises routing instructions for sending messages to the first network device that is associated with the service provider;
  generate a data transfer request that comprises:
    the first account number for the first user;
    the first routing number for the first user;
    the second user identifier for the second user;
    the data type identifier; and
    the data transfer type identifier;
  send the data transfer request to the first network device that is associated with the service provider in accordance with the routing instructions for the service provider, wherein sending the data transfer request initiates a data transfer between the first user and the second user.

16. The non-transitory computer-readable medium of claim 15, wherein the second user identifier comprises a phone number for the second user.

17. The non-transitory computer-readable medium of claim 15, wherein the second user identifier comprises an email address for the second user.

18. The non-transitory computer-readable medium of claim 15, wherein the data type identifier further identifies an amount of data to be transferred.

19. The non-transitory computer-readable medium of claim 15, wherein the data transfer type identifier indicates a data transfer from the second user to the first user.

20. The non-transitory computer-readable medium of claim 15, wherein the data transfer type identifier indicates a data transfer from the first user to the second user.

* * * * *